United States Patent
Neuhaus et al.

[11] Patent Number: 6,085,829
[45] Date of Patent: Jul. 11, 2000

[54] REGENERATOR TYPE HEAT EXCHANGER

[75] Inventors: Peter D. Neuhaus; Rajiv K. Mongia, both of Berkeley; Robert W. Dibble, Livermore; Steven G. Buckley, San Mateo, all of Calif.

[73] Assignee: Solo Enery Corporation, Alameda, Calif.

[21] Appl. No.: 09/034,394

[22] Filed: Mar. 4, 1998

[51] Int. Cl.[7] .................................................. F23L 15/02
[52] U.S. Cl. .................................... 165/9; 165/8; 60/653; 60/679
[58] Field of Search .............................. 165/9, 8; 60/653, 60/679

[56] References Cited

U.S. PATENT DOCUMENTS

| | | | |
|---|---|---|---|
| 2,939,286 | 6/1960 | Pavlecka | 60/679 |
| 2,978,227 | 4/1961 | Hess | 165/9 |
| 3,003,750 | 10/1961 | Hess | 165/9 |
| 3,077,074 | 2/1963 | Collman et al. | 165/9 |
| 3,368,612 | 2/1968 | Brummett | 165/9 |
| 3,373,798 | 3/1968 | Brummett | 165/9 |
| 3,476,174 | 11/1969 | Guernsey et al. | 165/9 |
| 3,478,816 | 11/1969 | Helms | 165/9 |
| 3,813,884 | 6/1974 | Ishikawa | 60/679 |
| 3,998,059 | 12/1976 | Randell | 60/653 |
| 3,999,597 | 12/1976 | Sato | 165/9 |
| 4,105,062 | 8/1978 | Bell, III et al. | 15/9 |
| 4,183,539 | 1/1980 | French et al. | 165/9 |
| 4,338,992 | 7/1982 | Handa | 165/9 |
| 4,422,298 | 12/1983 | Nozawa | 60/653 |

Primary Examiner—Ira S. Lazarus
Assistant Examiner—Terrell McKinnon
Attorney, Agent, or Firm—Burns, Doane, Swecker & Mathis, L.L.P.

[57] ABSTRACT

Heat is exchanged between high and low temperature gases in a regenerator type of heat exchanger, wherein the high temperature gas is conducted through a high temperature passage formed in a housing, and the low temperature gas is conducted through a low temperature passage formed in the housing. A porous heat transfer core is rotated such that portions of the core pass sequentially through the high and low temperature passages. The high temperature gas traveling in the high temperature passage is caused to flow through, and heat, a portion of the core disposed in the high temperature passage. The low temperature gas traveling in the low temperature passage is caused to flow through, and be heated by, a heated portion of the core disposed in the low temperature passage. A low pressure zone is established in a chamber situated at each location where the core travels from one of the passages to the other. A pressure in the low pressure zone is lower than pressures-in both of the passages, whereby gases tending to leak from one of the passages to the other are drawn into the low pressure zone and are conducted out of the housing.

14 Claims, 5 Drawing Sheets

REGENERATOR TYPE HEAT EXCHANGER

BACKGROUND OF THE INVENTION

The present invention relates to heat exchangers, such as a regenerator, utilizing a translating solid matrix for transferring heat between high and low temperature fluids, such as hot exhaust gas and a cold air/fuel stream.

Heat exchangers for transferring heat between flowing fluid streams operate in many different ways. For example, some heat exchangers, such as recuperators, have no moving parts. The fluid streams flow in separate streams through a stationary matrix which transfers heat between the streams by conduction. These types of heat exchangers are relatively massive and, in the event that a change in the rate of heat transfer is desired, the response time is slow. Also, one of the fluid streams, e.g., a liquid, is typically conducted through small tubes which are secured together by weld joints which, by their very nature, are subject to leakage.

A conventional regenerator type of heat exchanger conducts a hot gas flow and a cold gas flow through different sections of a rotating porous core, which can be in the form of a disc, a hollow cylindrical drum, blocks of material, spheres, or any other geometrical form which is arranged so that the core material is disposed in and heated in the hot gas flow and then is moved into the cold gas flow for the purpose of heating the cold gas flow. Once cooled, the core material is reintroduced into the hot gas flow, completing the cycle. The core material may be moved by rotation, translation, flow (as in the case of small spheres or other finely divided materials) or other means. In the typical example depicted in FIG. 1, a portion of a core 12 is heated to a quasi-steady temperature profile by the hot (exhaust) flow, and then that heated core portion heats up the cold (pressurized intake) flow. The core is rotatably mounted in a fixed ducting (not shown) which possesses stationary seals engaging the rotating core along areas 14 shown as broken lines in FIG. 1, to isolate the hot and cold flows from one another. The core may comprise, for example, a steel mesh, metal foils, metal honeycomb structures, or a multitude of passages oriented parallel to the direction of fluid flow. Because the core rotates about an axis A while the flow ducting is stationary, the core rotational speed is a controlling parameter determining the amount (rate) of the heat transfer, and thus, by adjusting the rotational speed, the amount of heat transferred to the cold gas can be adjusted. It will be appreciated that in any other arrangement involving a movable heat transfer core, the same effect may be achieved by varying the parameter analogous to rotational speed (i.e., translation speed in the case of blocks, flow rate in the case of finely divided materials, etc.)

A regenerator is less massive than a recuperator of comparable effectiveness, and has a quicker response time for changing the rate of heat transfer. Also, regenerators do not rely on welds for preventing leakage and thus are not susceptible to weld leakage.

Figure 1:
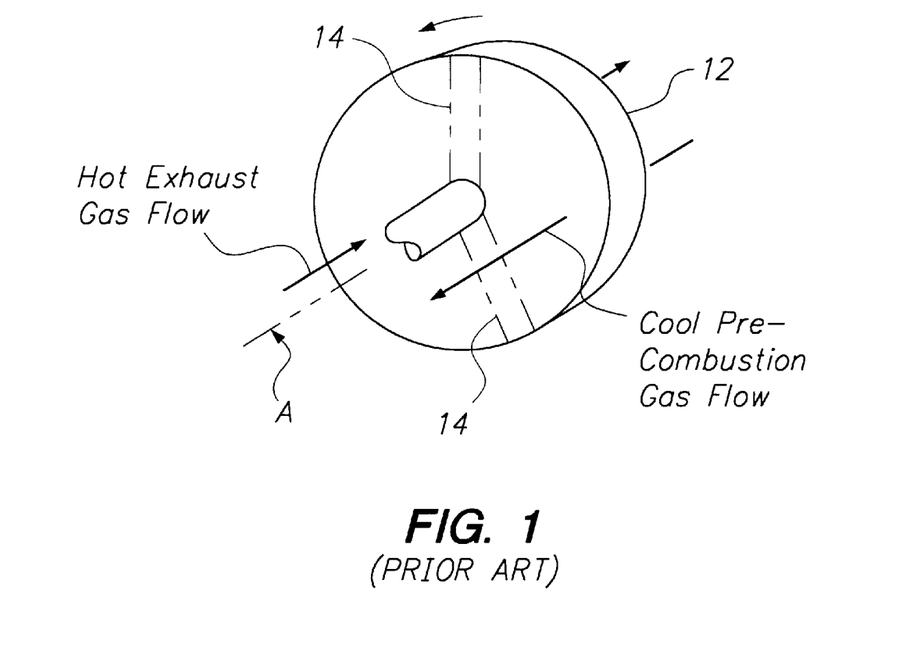
FIG. 1 is a schematic perspective view of a conventional disc type core for use in a regenerator type of heat exchanger.

It will also be appreciated that regardless of the particular regenerator configuration being used, if the cold and hot gas streams are at different pressures, leakage tends to occur between the cold and hot sides across the seal areas 14. Such leakage could be a problem if the regenerator were used in a small energy generating system wherein the hot gas constitutes an exhaust gas, and the cold gas constitutes a high-pressure air/fuel stream in route to being combusted. In that case, fuel (hydrocarbons) from the high pressure air/fuel stream would tend to leak into the lower pressure exhaust gas stream. Since the exhaust gas is typically eventually vented to atmosphere, there would result a release of air-polluting hydrocarbons into the atmosphere.

A regenerator having a drum type of core may be preferred over a disc core, because a drum core can be made smaller, is less susceptible to warping, and is of lighter weight. However, the leakage problem also exists in regenerators having drum type cores, cone type cores, cores composed of spheres, blocks, etc., i.e., in any arrangement wherein the ducts separating and conducting the high and low pressure gases are stationary and the core material is in motion.

Therefore, it would be desirable to minimize the leakage (and resulting pollution) problem in regenerators, especially, but not limited to, regenerators having a drum or disc type core.

SUMMARY OF THE INVENTION

The present invention relates to a regenerator for transferring heat from a high temperature gas to a low temperature gas. The regenerator comprises a housing enclosing a space having a high temperature passage and a low temperature passage for conducting high-temperature gas and low-temperature gas, respectively. A gas permeable heat transfer core is mounted for movement in the space such that portions of the core pass sequentially through the high and low temperature passages. High temperature inlet and outlet ports are formed in the housing for conducting high temperature gas into and from the high temperature passage on upstream and downstream sides, respectively, of the core, so that high temperature gas flows through, and heats, that portion of the core disposed in the high temperature passage. Low temperature inlet and outlet ports are formed in the housing for conducting low temperature gas into and from the low temperature passage on upstream and downstream sides, respectively, of the core, whereby low temperature gas flows through, and is heated by, a heated portion of the core situated in the low temperature passage. A drive mechanism is provided for moving the core, so that the heated portion of the core situated in the high temperature passage enters the low temperature passage to heat low temperature gas. A sealing arrangement is disposed between the high and low temperature passages for resisting leakage of gas therebetween.

Each sealing arrangement preferably includes a chamber disposed between the high and low temperature passages and enclosing a respective one of the openings in the wall structure. The chamber is at a pressure lower than respective pressures in the high and low temperature passages and communicates with a conduit leading outside of the housing, whereby gases entering the chamber are conducted out of the housing.

The core is preferably configured as a cylindrical drum, a circular disc, although other configurations, such as conical, could be used.

The core is preferably a porous metallic body formed of sintered metal powder particles, with pores between the particles forming serpentine gas-conducting paths through the body.

Gases entering the chamber and discharged out of the housing can be reintroduced into a compressor of an energy generating system.

Instead of a single chamber being provided, there can be a plurality of chambers arranged in sequence between the high and low pressure passages, whereby pressures in the chambers are of progressively decreasing magnitude and are reintroduced into a compressor side of an energy generating system at locations of progressively decreasing pressure.

The invention also relates to a method of exchanging heat between high and low temperature gases. The method comprises conducting the high temperature gas through a high temperature passage formed in a housing. The low temperature gas is conducted through a low temperature passage formed in the housing. A porous heat transfer core is moved such that portions of the core pass sequentially through the high and low temperature passages. The high temperature gas traveling through the high temperature passage is caused to flow through and heat a portion of the core disposed in the high temperature passage. Low temperature gas traveling through the low temperature passage is caused to flow through, and be heated by, a heated portion of the core disposed in the low temperature passage. A low pressure zone is established at each location where the core travels from one of the passages to the other. A pressure in that low pressure zone is lower than pressures in both of the passages, whereby gases tending to leak from one of the passages to the other are drawn into the low pressure zone and are conducted out of the housing.

BRIEF DESCRIPTION OF THE DRAWING

The objects and advantages of the invention will become apparent from the following detailed description of the preferred embodiments thereof in connection with the accompanying drawing in which like numerals designate like elements and in which.

DETAILED DESCRIPTION OF PREFERRED EMBODIMENTS OF THE INVENTION

Figure 2:
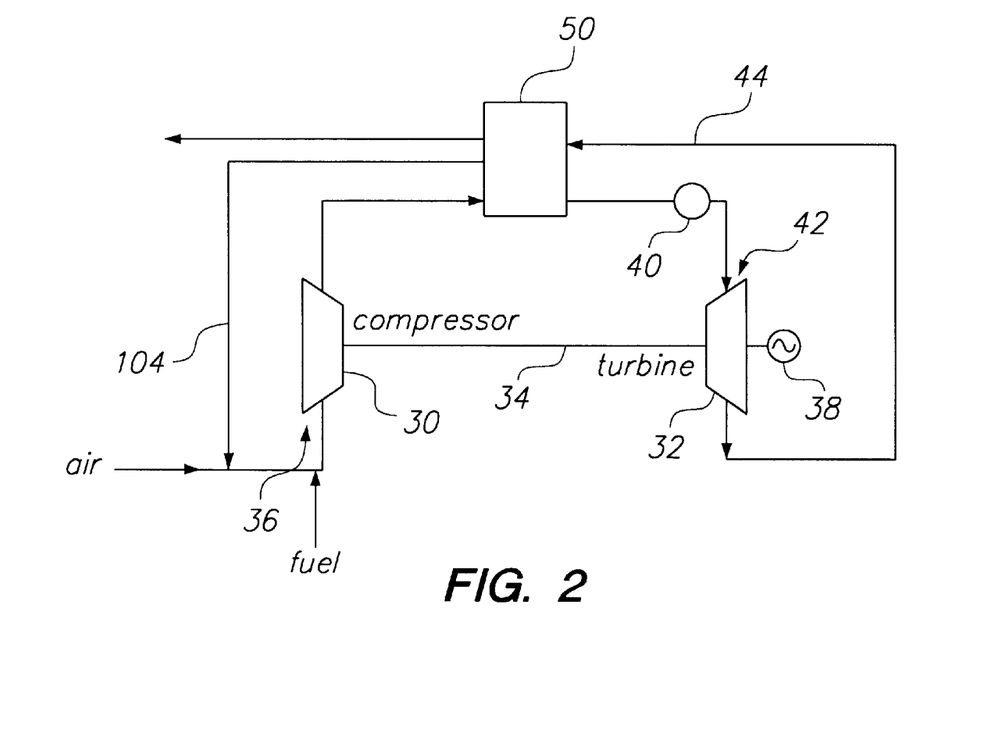
FIG. 2 is a schematic view of an energy generating system employing a regenerator type heat exchanger according to the present invention.

Depicted in FIG. 2 is an energy generating system 20 which employs a regenerator type heat exchanger 50 according to the present invention. The energy generating system is disclosed in more detail in concurrently filed U.S. application Ser. No. 09/034,107, the disclosure of which is incorporated by reference herein. The system includes a compressor 30, a turbine 32, and an electric generator 38 all mounted on a common shaft 34. Fuel and air are delivered to the inlet 36 of the compressor, and a stream of compressed air and fuel from the compressor is passed through the cold side of the regenerator 50 to be heated by heat transferred from hot combustion gas produced by a catalytic combustor 40. The heated compressed air/fuel from the cold side of the regenerator is then supplied to a catalytic combustor 40. Exhaust gas from the combustor 40 is expanded within the turbine to drive the turbine, and then is conducted to the hot side of the regenerator.

As the turbine rotates, it drives the generator 38, and the hot gases leaving the hot side of the regenerator can be used to energize items such as a hot water heater. Such a system is potentially useful as an energy center in a home or small business.

As noted earlier, an air pollution problem can exist if fuel from the air/fuel stream leaks into the hot exhaust gas within the regenerator, because the exhaust gas is eventually discharged into the atmosphere.

Therefore, the present invention relates to a regenerator type of heat exchanger having improved heat exchange properties and minimal leakage of gases across the hot and cold sides of the regenerator.

Figure 3:
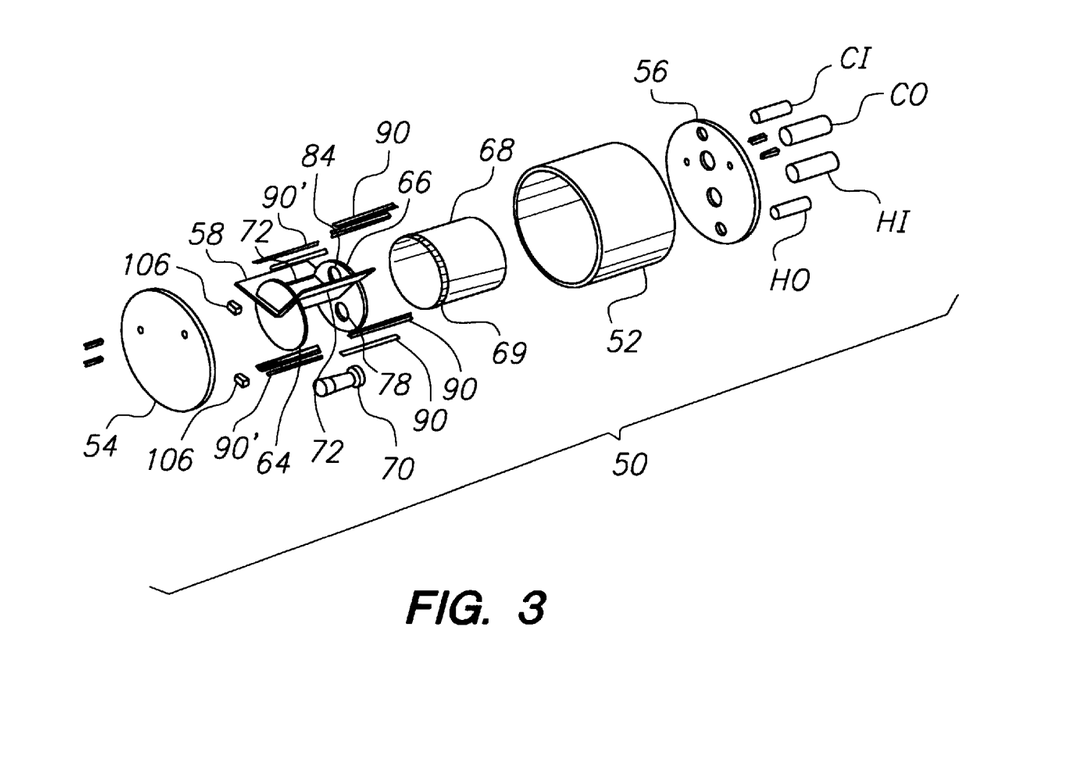
FIG. 3 is an exploded perspective view of a regenerator according to the present invention.
Figure 4:
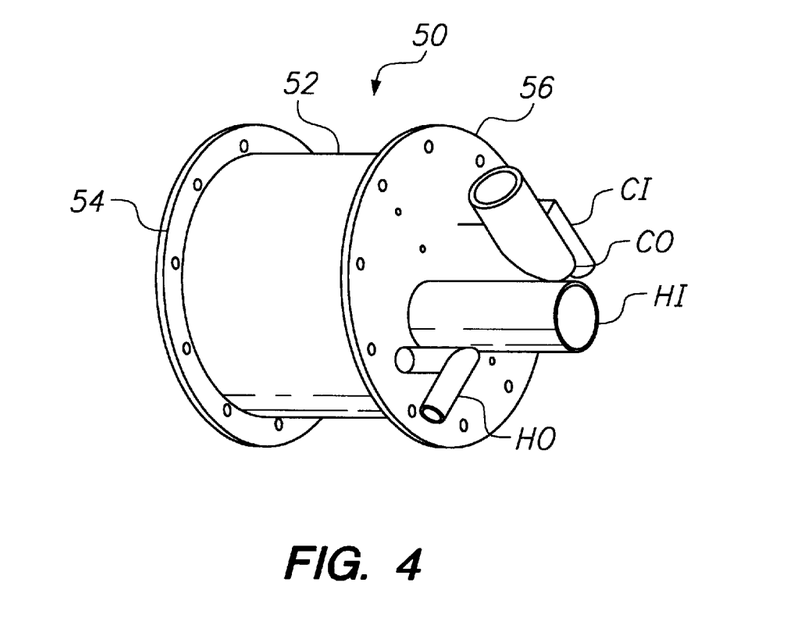
FIG. 4 is a perspective view of the regenerator depicted in FIG. 3.
Figure 5:
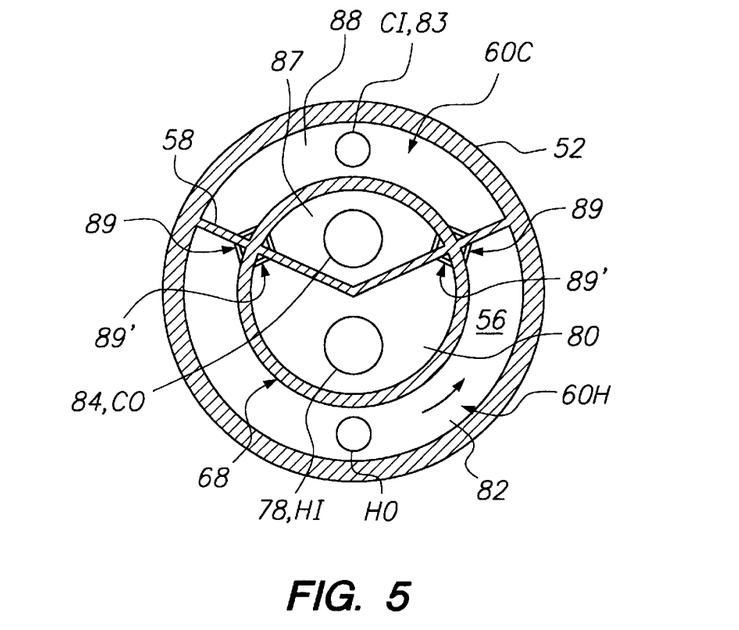
FIG. 5 is a vertical sectional view taken through the regenerator shown in FIG. 4.

Depicted in FIG. 3 is an exploded perspective view of the regenerator type heat exchanger 50 which comprises a cylindrical outer housing 52 defining a longitudinal axis. A pair of circular end walls 54, 56 are fixed on opposite longitudinal ends of the housing 52 whereby a space is enclosed by the housing and end walls. Fixed in that space (e.g., secured to the inside of the housing 52) is a V-shaped wall structure 58 which divides the space into a high temperature passage (hot side) 60H and a low temperature passage (cold side) 60c, as shown in FIG. 5. Fixed to the wall structure 58 are two longitudinally spaced circular end plates 64, 66. Mounted on the end plates 64, 66 for rotation relative thereto is a heat transfer core in the form of a cylindrical drum 68. An adjustable speed motor 70 is mounted in the space for engaging gear teeth 69 arranged on an outer circumference of the drum 68 to rotate the drum about its longitudinal axis. As it rotates, the drum 68 passes through two longitudinal slots 72 formed in the wall structure 58, whereby portions of the drum pass sequentially between the hot and cold sides of the regenerator. Other methods of driving the core in this preferred embodiment include a belt drive, or a roller drive wherein rollers are placed on opposite sides of the core.

The drum 68 is gas permeable, i.e., it is constructed so as to be capable of conducting gas at least between radially spaced sides thereof. The term "gas" is intended to include a mixture of air and fuel, the fuel being in either a gaseous or vaporous state. The drum could comprise numerous radially oriented tubes, or metal mesh or metal foil, to provide the necessary porosity. However, a preferred and less expensive arrangement according to the present invention involves the use of a porous metal media, i.e., a metal body having a porous structure which enables a fluid flow in the radial direction. Such porous metal materials are known for other uses, e.g., as filters, and are available, for example, from Mott Industrial, a division of Mott Corp., Farmington, Conn. In brief, a body in the form of a thin sheet could be formed by sintering metal powder particles whereby the particles adhere together and form a highly porous structure. Gas flowing through the sheet follows a highly serpentine path, aiding heat transfer. The pores define a serpentine path through the sheet. The sheet would then be rolled into a cylindrical drum shape and used as a rotatable heat transfer media in the regenerator 50. The drum could be made relatively small, e.g., about 3 mm thick, 1.5 feet in diameter, and about 9 inches in length, while providing the necessary heat transfer efficiency. Other methods could be used to produce porous metal structures suitable for use as a regenerator core.

Connected to the end wall 56 are: a cold gas inlet CI, a cold gas outlet CO, a hot gas inlet HI and a hot gas outlet HO. (Alternatively, the outlets CO and HO could be formed in the other end wall 54.) In operation, hot gas travels through the hot gas inlet HI and then through an aligned hole 78 formed in the end plate 66, whereupon the hot gas enters an inlet section 80 of the hot side 60H. That hot gas travels along the drum and passes radially through the drum via serpentine paths defined by the porous metal structure of the drum material. The hot gas then enters an outlet section 82 of the hot side and eventually exits the housing via the hot outlet HO. Accordingly, the rotating drum is heated.

Meanwhile, the cold air/fuel stream travels through the cold inlet CI, whereupon the cold stream enters an inlet section 88 of the cold side 60C. That cold stream travels radially through the serpentine paths of the drum, while absorbing heat therefrom. The heated air/fuel stream then enters an outlet section 87 of the cold side and passes through an aligned hole 83 formed in the end plate 66, and eventually exits the housing 52 via cold outlet CO.

The air/fuel stream is now at an elevated temperature more suitable for undergoing a reaction in the catalytic reactor 40.

As the hot and cold gases travel within the housing, there is a tendency for the high pressure air/fuel stream to leak into the hot side of the regenerator through gaps formed between the drum 68 and the wall structure 58. If that occurred, the hydrocarbons of the fuel would foul the hot exhaust gas and present air pollution problems if the exhaust gas is discharged into the atmosphere.

Figure 6:
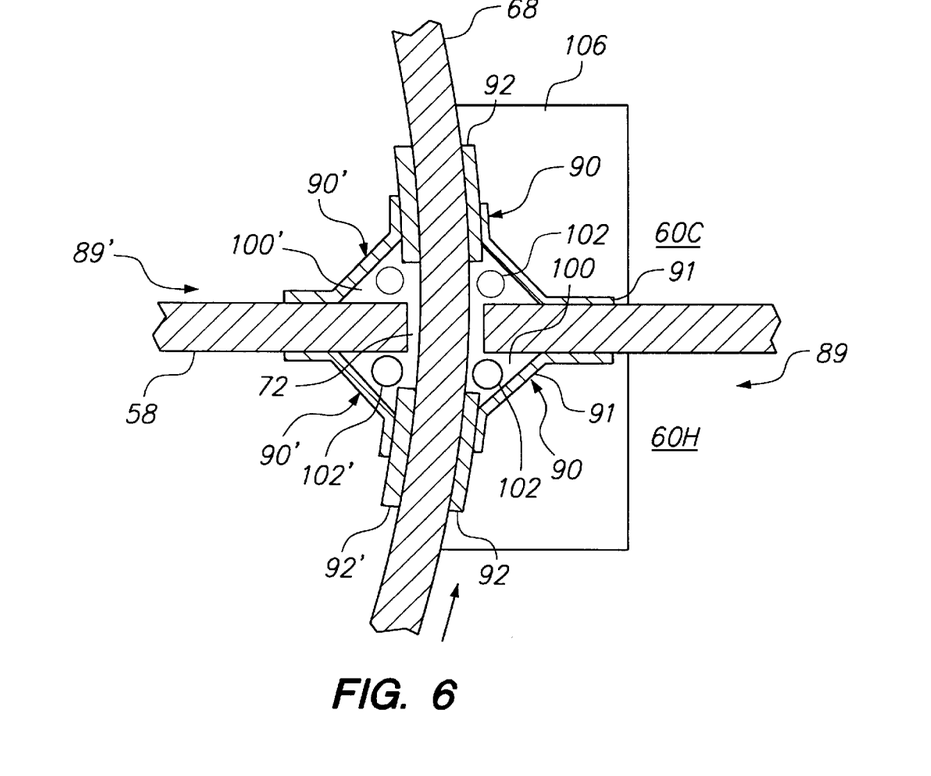
FIG. 6 is an exploded fragmentary view of a sealing portion of the regenerator depicted in FIG. 5.

Accordingly, seal arrangements 89 are provided to prevent such leakage. Each seal arrangement 89 includes two seal members 90, such as plates 91 carrying gas barriers in the form of pads 92 of high temperature resistant, low friction material like Hastelloy™ for example. The plates 91 are mounted to the wall structure 58, with the pads placed in contact with the drum 68, on respective sides of the wall structure 58, to resist leakage of air/fuel from the cold side to the hot side. However, sufficient leakage could still occur past the pads 92 for creating an appreciable pollution problem, as well as diminishing the efficiency of a small-scale energy generating system.

In accordance with the present invention, however, a low pressure chamber 100 is formed between the pads 92, which creates a zone of lower pressure than the pressures of the hot and cold sides and which communicates outside of the housing 52 so that a flow can be established which draws in any air/fuel attempting to leak from the high-pressure air/fuel mixture to the lower-pressure exhaust side.

Thus, the two seals 90 located on opposite sides of the wall 58 cooperate with one another and with the gap situated between the drum and the wall, to form the chamber 100. The pressure of that chamber 100 is made lower than the pressures of either of the hot and cold sides by being communicated with a low pressure source outside of the housing 52. That low pressure source could be of any suitable nature, such as the inlet 36 of the compressor 30. Thus, the chamber 100 is provided with at least one outlet 102 which communicates with the compressor inlet 36 via conduit 104 (see FIG. 2). If the chamber 100 has two outlets 102, those outlets would be connected to the conduit 104 in a manifold 106. It will be appreciated that the magnitude of the pressure in the chamber 100 is not important, as long as it is lower than the pressures in the hot and cold sides whereby a flow out of the housing 52 is established. Thus, the pressure in the chamber 100 could be at, above, or below atmospheric pressure, depending upon the magnitudes of the pressures in the hot and cold sides.

A seal arrangement 89 disposed on the outer surface of the drum has been thus far described. It will be appreciated that a similar seal arrangement 89' would be disposed at the inner surface of the drum including seals 90' disposed on opposite sides of the wall structure 58, for creating a low pressure chamber 100'. That chamber would communicate via hole(s) 102' with the conduit 104 at the manifold 106.

In the event that the drum is formed of a sintered porous metal as earlier described, the serpentine paths formed therein may also extend circumferentially of the drum. This would pose a potential leakage problem whereby gas could leak from the cold side to the hot side through the drum. Such a problem can be avoided by making the pads 92 of sufficient length in the circumferential direction that in order for any serpentine path to extend circumferentially through the drum from the cold side to the hot side, that path would have to be so long that the resistance to gas flow therein would be great enough to prevent gas from traveling therethrough.

In lieu of pads 92, any other suitable type of wear resistant, gas barriers could be employed to form outer borders of the chambers 100, such as rollers or a micro-gap seal arrangement for example.

Figure 7:
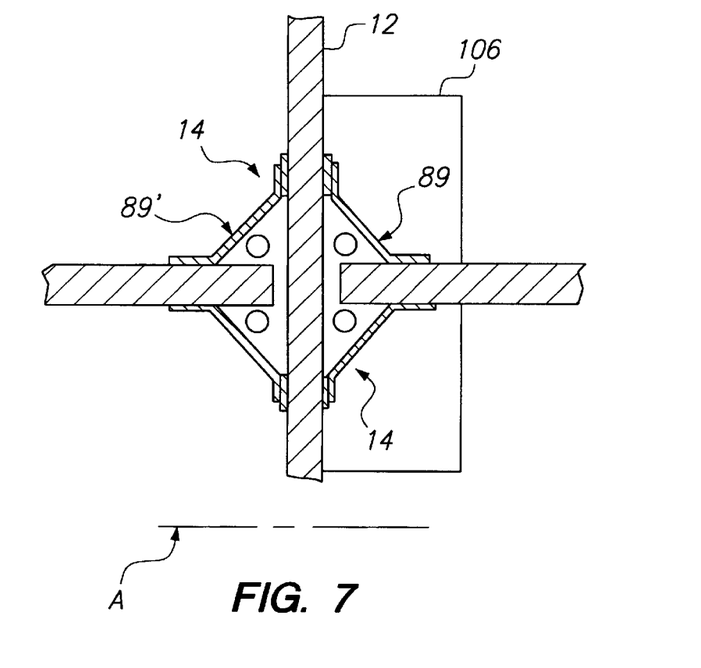
FIG. 7 is a view similar to FIG. 6 wherein the sealing mechanism is used in connection with a flat disc type of core.

Although the above-described preferred embodiment involves a heat exchanger employing a drum type of core 68, the invention is also applicable to heat exchangers employing a disc type of core, such as the disc described in connection with FIG. 1. Thus, as depicted in FIG. 7, seal arrangements 89, 89' are employed in connection with a flat disc 12 and function in the same manner as the seal arrangements described in connection with FIG. 6. The disc could also be formed of the earlier described porous metal body which provides serpentine gas flow paths between axially spaced sides of the disc.

Figure 8:
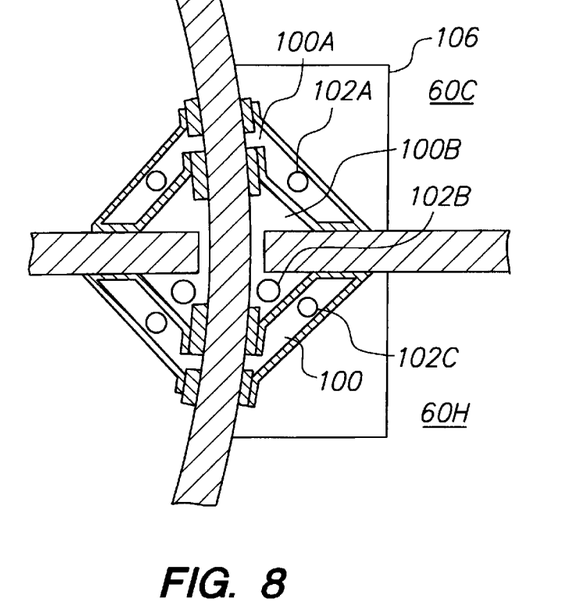
FIG. 8 is a view similar to FIG. 6 of a modified sealing mechanism.
Figure 9:
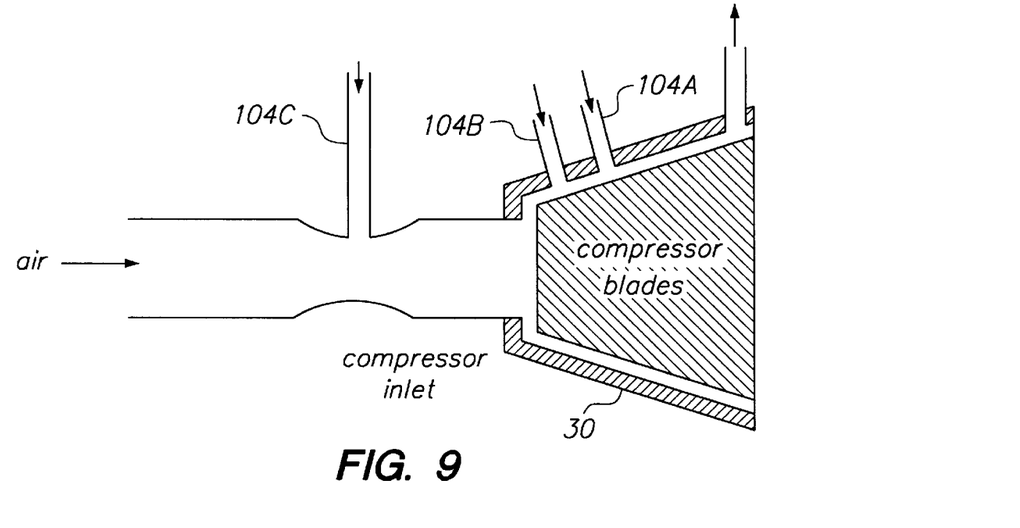
FIG. 9 is a schematic view of a compressor arrangement employed in connection with the sealing mechanism depicted in FIG. 8.

While the seal arrangement 89 (or 89') disclosed in connection with FIG. 6 contains a single chamber 100 (or 100'), there could be a plurality of chambers, as depicted in FIG. 8 wherein three adjacent low pressure chambers 100A, 100B, and 100C are arranged in series between the high and low temperature passages. Each of those chambers has its own respective discharge port 102A, 102B, and 102C. Rather than being combined in the manifold 106, however, the discharge gases flowing through those ports are kept separate and reintroduced into separate locations of the energy generating system. In that regard, since chamber 100A is located nearest to the high pressure region 60C, it will be at a higher pressure than the next chamber 100B, and the pressure in chamber 100B will be higher than that in chamber 100C. Thus, the air/fuel streams discharged from the ports 102A, 102B, 102C will be of progressively decreasing pressures and reintroduced into areas of progressively decreasing pressure regions of the compressor section of the energy generating system. Thus, for example, as shown in FIG. 9, three additional inlet conduits 104A, 104B, 104C could be associated with the compressor 30 of FIG. 2, which conduits receive air/fuel streams from the ports 102A, 102B, 102C, respectively. Those streams are of progressively decreasing pressures and are introduced into progressively decreasing pressure regions of the compressor so as to minimize any disruptions in the normal pressure distribution pattern.

Figure 10:
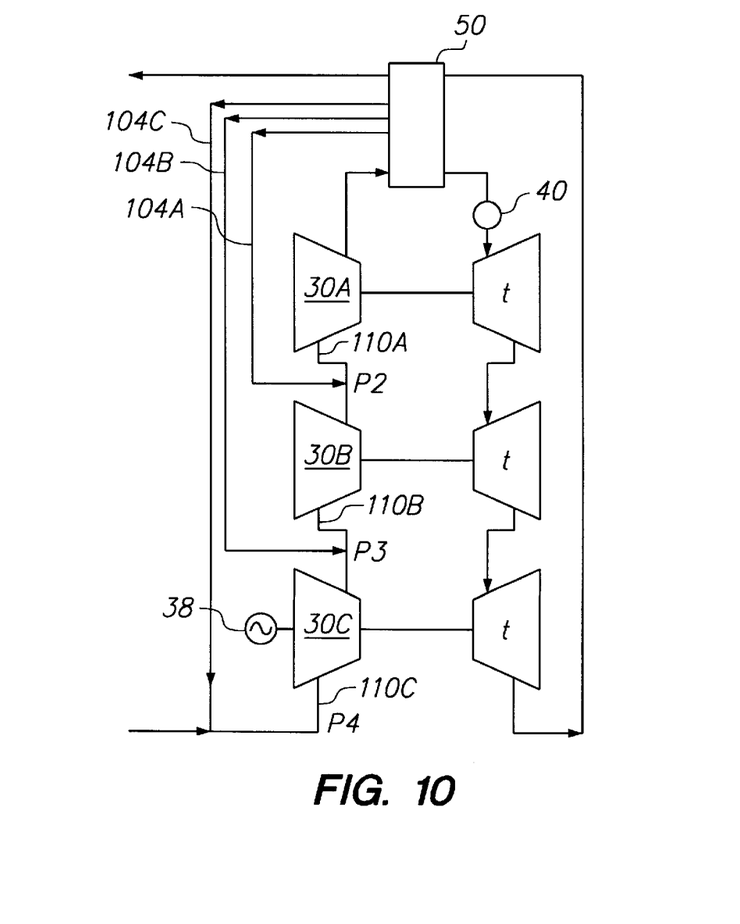
FIG. 10 is a schematic view of an energy generating system for use with the sealing mechanism depicted in FIG. 8.

Alternatively, as shown in FIG. 10 the discharged pressures in conduits 104A, 104B, 104C could be introduced into conduits 110A, 110B, 110C, respectively, which are associated with compressors 30A, 30B, 30C of a multi-spool system. It will be appreciated that pressure P2 in conduit 110A is greater than the pressure P3 in conduit 110B, and the latter is greater than the pressure P4 in conduit 110C.

From the foregoing, it will appreciated that the present invention provides a regenerator type of heat exchanger which is small, more effective, and pollution-free. The smallness and higher efficiency result from the use of a porous metal body for forming the core (i.e., as either the drum 68 or disc 12 or a cone). The pollution-free characteristic results from the presence of seal arrangements which form low-pressure chambers or zones that conduct leaked gases outside of the heat exchanger where they can be reused or otherwise treated.

The regenerator also possesses other desirable characteristics such as the ability to reach a heated operating state in a short period of time, and the ability to adjust the rate of heat transfer by merely varying the rate of rotation of the core.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A regenerator for transferring heat from a high temperature gas to a low temperature gas, comprising:
    a housing enclosing a space having a high temperature passage and a low temperature passage for conducting high temperature/low pressure gas and low temperature/high pressure gas, respectively, said high temperature passage and said low temperature passage being separated by a wall having first and second slots formed therein;
    a gas permeable heat transfer core mounted for movement in said space such that portions of said core pass sequentially through said high and low temperature passages by traveling sequentially through said slots, whereby each slot has a high temperature side facing said high temperature passage and a low temperature side facing said low temperature passage;
    high temperature inlet and outlet ports formed in said housing for conducting high temperature gas into and from said high temperature passage on upstream and downstream sides, respectively, of said core, whereby high temperature gas flows through, and heats, a portion of said core disposed in said high temperature passage;
    low temperature inlet and outlet ports formed in said housing for conducting low temperature gas into and from said low temperature passage on upstream and downstream sides, respectively, of said core, whereby low temperature gas flows through, and is heated by, a heated portion of said core situated in said low temperature passage;
    a drive mechanism for moving said core, so that said heated portion of said core situated in said high temperature passage enters said low temperature passage to heat low temperature gas; and
    first and second sealing arrangements disposed at each of said slots for resisting leakage between said high and low temperature passages, each sealing arrangement including a first gas barrier disposed at said high temperature side of a respective slot and a second gas barrier disposed at said low temperature side of said respective slot, said first and second gas barriers forming therebetween a chamber which is at a pressure lower than respective pressures in said high and low temperature passages, said chamber communicating with a conduit leading outside of said housing, whereby gases entering said chamber are conducted out of said housing.

2. The regenerator according to claim 1 wherein the core is rotatable about an axis of rotation.

3. The regenerator according to claim 2 wherein said core is configured as a cylindrical drum having a central axis coincident with said axis of rotation, said drum configured to conduct gases therethrough between radially spaced outer and inner surfaces thereof.

4. The regenerator according to claim 1 wherein said core comprises a disc mounted for rotation about a center axis thereof, said disc configured to conduct gas therethrough between axially spaced surfaces thereof.

5. The regenerator according to claim 1 wherein said core is a porous metallic body forming serpentine gas-conducting paths through said body.

6. The regenerator according to claim 5 wherein said body is formed of sintered metal powder particles.

7. The regenerator according to claim 5 wherein said body is a wire mesh.

8. The regenerator according to claim 5 wherein said body is a metal foil.

9. The regenerator according to claim 1 wherein said sealing arrangement includes a first plate carrying said first gas barrier which opposes a surface of said core in said high temperature passage, and a second plate carrying said second gas barrier which opposes said core surface in said low temperature passage.

10. An energy generating apparatus comprising:
    a compressor and turbine mounted on a shaft, said compressor including a passage for conducting a compressed air/fuel stream from an outlet of said compressor to an inlet of said turbine; and
    a regenerator disposed in said passage for heating a compressed air/fuel stream traveling from said compressor to said turbine, said heat exchanger comprising:
        a housing enclosing a space having a high temperature passage and a low temperature passage for conducting high temperature/low pressure gas and low temperature/high pressure gas, respectively, said high temperature passage and said low temperature passage being separated by a wall having first and second slots formed therein;
        a gas permeable heat transfer core mounted for movement in said space such that portions of said core pass sequentially through said high and low temperature passages by traveling sequentially through said slots, whereby each slot has a high temperature side facing said high temperature passage and a low temperature side facing said low temperature passage;
        high temperature inlet and outlet ports formed in said housing for conducting high temperature gas into and from said high temperature passage on upstream and downstream sides, respectively, of said core, whereby the high temperature gas flows through, and heats, a portion of said core disposed in said high temperature passage, said high temperature inlet port operably connected to an outlet of said turbine whereby said hot gas constitutes hot exhaust gases from said turbine;

low temperature inlet and outlet ports formed in said housing for conducting low temperature gas into and from said low temperature passage on upstream and downstream sides, respectively, of said core, whereby low temperature gas flows through, and is heated by, a heated portion of said core situated in said low temperature passage, said low temperature inlet port operably connected in said passage extending from said compressor to said turbine whereby said low temperature gas constitutes the compressed air/fuel stream from said compressor;

a drive mechanism for moving said core, so that said heated portion of said core situated in said high temperature passage enters said low temperature passage to heat low temperature gas; and first and second sealing arrangements disposed at each of said slots for resisting leakage between said high and low temperature passages, each sealing arrangement including a first gas barrier disposed at said high temperature side of a respective slot and a second gas barrier disposed at said low temperature side of said respective slot, said first and second gas barriers forming therebetween a chamber which is at a pressure lower than respective pressures in said high and low temperature passages, said chamber communicating with a conduit operably connected to said compressor for recycling leaked gases to said compressor, and thereby minimizing pollution of the atmosphere by said leaked gases.

11. The energy generating apparatus according to claim 10 wherein the core is rotatable about an axis of rotation.

12. The energy generating apparatus according to claim 10 wherein said conduit is connected to an inlet side of said compressor.

13. The energy generating apparatus according to claim 10 wherein each of said sealing arrangements further includes a plurality of said chambers arranged in series between said high and low temperature passages, whereby pressures in said chambers become gradually reduced in a direction away from said low temperature passage, said chambers being in communication with respective locations of gradually decreasing pressure, respectively at said compressor.

14. The energy generating apparatus according to claim 10 wherein there are a number of compressors connected in series and mounted on shafts connected to respective turbines, each of said sealing structures further including a plurality of adjacent chambers arranged in series between said high and low temperature passages, whereby pressures in said chambers become gradually reduced in a direction away from said low temperature passage, said chambers being in communication with respective ones of said compressors at locations of gradually decreasing pressure.

* * * * *